2,882,866

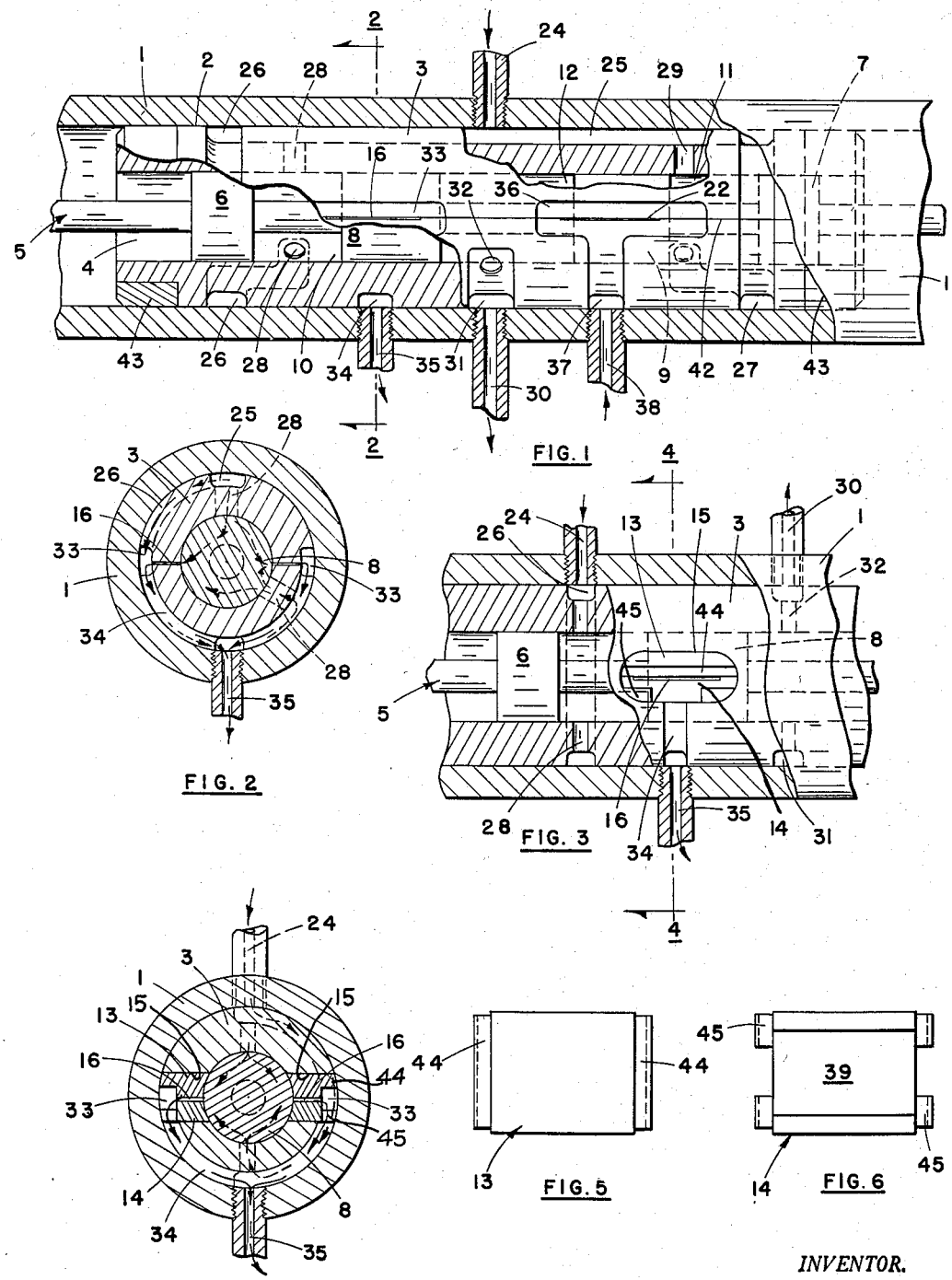
April 21, 1959  B. D. FLOYD  2,882,866
SLOT PORT FOR VALVE
Filed Feb. 8, 1954
INVENTOR.
BURTON B. FLOYD
BY William L. Lane
ATTORNEY United States Patent Office 2,882,866
Patented Apr. 21, 1959

SLOT PORT FOR VALVE

Burton D. Floyd, Long Beach, Calif., assignor to North American Aviation, Inc.

Application February 8, 1954, Serial No. 408,898

1 Claim. (Cl. 121—46.5)

This invention relates to hydraulic valves and particularly to an improved valve port and the method of fabricating this port to provide a valve characterized by exceptional output linearity and sensitivity.

Ordinarily, hydraulic valve ports are fashioned in circular form, primarily because of the ease of fabricating such a form. However, it is obvious that such a configuration does not provide an uncovered port area linearly proportional to the displacement of the port closing element. The use of square ports in some instances has resulted in improved linearity, but this configuration has little effect on sensitivity because of the relatively large port area covered with respect to port closing element displacement.

It is contemplated by this invention to provide a rectangular valve port of exceptional linearity and sensitivity.

It is therefore an object of this invention to provide a valve port of improved linearity and sensitivity.

It is another object of this invention to provide a rectangular valve port.

It is yet another object of this invention to provide a valve having ports, which valve is characterized by exceptional output linearity and sensitivity.

It is still another object of this invention to provide a relatively long, narrow valve port.

It is a still further object of this invention to provide an improved method for fabricating a relatively long, narrow valve port.

Another object of this invention is the provision of a method for assembling a valve having relatively long, narrow ports.

A still further object of this invention is to provide an improved method for fabricating a valve port of improved linearity and sensitivity.

Yet another object of this invention is the provision of a method of fabricating a valve of exceptional output linearity and sensitivity.

Other objects of invention will become apparent from the following description taken in connection with the accompanying drawings, in which—

Fig. 1 is an elevational view of an assembled spool-type valve, with the valve body in section, showing narrow, longitudinal valve ports fabricated in accordance with this invention;

Fig. 2 is a cross-sectional view taken along line 2—2 of Fig. 1;

Fig. 3 is an elevational view similar to that of Fig. 1 showing a portion of a modified form of valve port fabrication;

Fig. 4 is a cross-sectional view taken along line 4—4 of Fig. 3 after the sleeve and the inserts have been bored to receive the spool assembly;

And Figs. 5 and 6 are plan views of the inserts forming the valve ports of the device of Fig. 3 before they are bored as shown in Fig. 4.

In detail, Fig. 1 shows valve body 1 centrally bored, as at 2, to accommodate cylindrical valve sleeve 3. Valve sleeve 3 in turn has central through-bore 4 formed therein, within which resides spool assembly 5. Spool assembly 5 comprises end pistons 6 and 7 and valving spools 8 and 9, all adapted to move together. Relatively long, narrow slots or valve ports 16, 22 are formed through opposite sidewalls of sleeve 3 by a method to be described later.

Between end pistons 6, 7 inlet port 24, connected to a high pressure source (not shown) is formed through body 1 and communicates with annular channels 26, 27 and longitudinal channel 25 formed in the external surface of valve sleeve 3. These channels are in turn connected to chamber 10, between piston 6 and spool 8, and chamber 11, between piston 7 and spool 9 through holes 28, 29. Outlet or return port 30 (connected to a sump, not shown) formed through body 1, communicates with partial-annular channel 31 in the external surface of valve sleeve 3. Channel 31 in turn connects to chamber 12, between spools 8 and 9 through holes 32.

Slot 16 connects through longitudinal channel 33 and semi-annular channel 34, formed in the external surface of valve sleeve 3, with port 35 through the wall of body 1. Similarly, slot 22 communicates through longitudinal channel 36 and semi-annular channel 37 with port 38. Fig. 2 shows that slot 16 is emergent on either side of valve sleeve 3, channels 33, 36 exist on either side of valve sleeve 3, and semi-annular channels 34, 37 communicate with each pair of longitudinal channels 33, 36, respectively.

In the operation of the valve, high pressure fluid from a pilot valve (not shown) is applied at the ends of spool assembly 5, on the outer faces of spools 6, 7, to cause the spool assembly to move to and fro as regulated by said pilot valve. High pressure fluid, from the high pressure source, is introduced into valve body 1 through port 24. It circulates via longitudinal channel 25, annular channel 26, and holes 28 into chamber 10 formed between end piston 6 and spool 8 and via channel 25, channel 27, and holes 29 into chamber 11 formed between end piston 7 and spool 9.

Spools 8 and 9 are of such widths and are so disposed that in the neutral position they respectively block any flow through slots 16, 22. In this position of spool assembly 5 there is no flow between chamber 10 and channel 33, between chamber 11 and channel 36, or between chamber 12, formed between spools 8, 9, and channels 33, 36.

If, through action of the pilot valve, spool assembly 5 is moved to the right (as seen in Fig. 1) high pressure fluid will be allowed to pass from inlet port 24 through longitudinal channel 25, annular channel 26, through holes 28, into chamber 10, through slot 16 and out through port 35 via channels 33, 34. Ports 35, 38 may be connected to either side of a conventional hydraulic actuator for any conventional purpose whereby the high pressure fluid will be reactive on the side of the hydraulic actuator connected to port 35. Simultaneously, return fluid from the other side of the hydraulic actuator, entrant through port 38, will pass in a similar manner through channels 37, 36 through the uncovered or open portion of slot 22 and finally through port 30 to the sump via chamber 12, holes 32, and channel 31.

With spool assembly 5 moved to the left, high pressure fluid will be allowed to pass through the opened portion of slot 22 and finally out through port 38; and as above, the return fluid will pass through port 35, the opened portion of slot 16, and out through port 30 to the sump.

In either case, it can be seen that the slots employed in this new design offers distinct advantages over the round or square ports conventionally used in valve design. For one thing, for a given open port area, a greater movement of the spool assembly is required to uncover the port. Hence, the configuration of this invention offers more sensitive control of the fluid flow to a hydraulic actuator or the like. Also, greater linearity of flow versus spool assembly displacement is afforded than with a circular port; the port area uncovered is a linear function of, or proportional to, the displacement of the spool assembly.

It is apparent that in spite of the obvious advantages of the slot ports previously described, they would not normally be given further consideration because of the difficulties attendant in the fabrication of such a shape in a sleeve. However, with the method to be described, such slot ports can be easily and cheaply formed in valve sleeves or walls.

Valve sleeve 3 of Figs. 1, 2 is formed in two halves as shown by the longitudinal dividing line 42. Using conventional machining practices, the various channels are formed in the exterior surfaces of each half of valve sleeve 3 and two very shallow channels are formed transversely of one of said half sleeves. Then the adjoining surfaces of each half sleeve are lapped and placed together in the position shown in Fig. 1 and the two halves may be secured in said position by end rings 43 prior to inserting sleeve 3 into valve body 1. The placing of the adjoining surfaces of each half sleeve together forms valve ports 16, 22 out of the very shallow transverse channels previously described.

In the modification shown in Figs. 3, 4 the configuration and operation of the valve is substantially the same as that described for the valve shown in Figs. 1 and 2, and similar portions are similarly referenced. In fabrication of the valves of Figs. 3, 4, however, valve sleeve 3 is fabricated in one piece and has apertures 15, 21 (the latter not shown) in place of longitudinal channels 33, 36 of the device of Fig. 1. Figs. 5 and 6 show the two inserts 13, 14 which form a set and are formed complementary to each aperture 15, 21. Each of said inserts has a longitudinally extending edge recess 44, 45, respectively. In addition, insert 14 is formed with a transverse, shallow channel 39 on the face adapted to be placed adjacent the face of insert 13. The two adjoining faces of inserts 13, 14 are lapped, placed together, and one set is inserted into each of the apertures 15 and 21 in valve sleeve 3. The placing of said inserts in such a position again forms narrow, longitudinal ports 16, 22 (the latter not shown). Edge recesses 44, 45 combine to form channels similar to channels 33, 36. The inserts may be then welded or brazed in place, the outside surface of valve sleeve 3 turned, and the interior of valve sleeve 3 bored to receive spool assembly 5. Each set of inserts 13 and 14 now is in four pieces since the center portion of the inserts has been removed by the boring operation as shown in Fig. 4. Finishing operations on the valve sleeve such as internal and external grinding and lapping are then undertaken. The result is a valve sleeve incorporating perfectly formed slot ports.

Although the invention has been described and illustrated in detail, it is to be clearly understood that the same is by way of illustration and example only and is not to be taken by way of limitation, the spirit and scope of this invention being limited only by the terms of the appended claim.

I claim:

In a fluid valve of improved linearity and sensitivity, a hollow valve body having a longitudinal axis, said body having an elongated bore through at least one side thereof substantially radially to said longitudinal axis, means forming a relatively narrow longitudinally rectangular slot port comprising a first insert member having a channel face with a wide shallow channel extending substantially radially to said longitudinal axis, the width being substantially parallel to said longitudinal axis and a second insert member coextensive with said first insert member and having a face adjacent the channel face of said first insert member, said first and second insert members being substantially coextensive with said bore, and means movably mounted within said body to variably control the opening of said slot port.

References Cited in the file of this patent

UNITED STATES PATENTS

| | | |
|---|---|---|
| 185,315 | Garratt | Dec. 12, 1876 |
| 1,521,628 | Jones | Jan. 6, 1925 |
| 1,586,844 | Bigby | June 1, 1926 |
| 1,787,628 | Jones | Jan. 6, 1931 |
| 2,034,122 | Terry | Mar. 17, 1936 |
| 2,212,343 | Goehring | Aug. 20, 1940 |
| 2,227,895 | Ferguson | Jan. 7, 1941 |
| 2,526,361 | Johnson | Oct. 17, 1950 |
| 2,540,467 | Williams | Feb. 6, 1951 |
| 2,675,831 | Jacques | Apr. 20, 1954 |